(12) United States Patent
Harrigan et al.

(10) Patent No.: US 8,668,417 B2
(45) Date of Patent: Mar. 11, 2014

(54) CARGO RESTRAINT SYSTEM AND METHOD FOR RESTRAINING CARGO

(71) Applicant: The Boeing Company, Seal Beach, CA (US)

(72) Inventors: William Ryan Harrigan, Hacienda Heights, CA (US); Thomas Reiner, Sherman Oaks, CA (US); Myles A. Rohrlick, San Diego, CA (US); Michael Patterson Johnson, Huntington Beach, CA (US); Anibal J. Garcia, Chino, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/932,530

(22) Filed: Jul. 1, 2013

(65) Prior Publication Data

US 2013/0294859 A1 Nov. 7, 2013

Related U.S. Application Data

(62) Division of application No. 12/200,226, filed on Aug. 28, 2008, now Pat. No. 8,500,379.

(51) Int. Cl.
*B61D 45/00* (2006.01)

(52) U.S. Cl.
USPC ........................................................ 410/100

(58) Field of Classification Search
USPC ..... 410/96, 100, 103; 24/68 R, 68 CD, 69 ST
See application file for complete search history.

(56) References Cited

U.S. PATENT DOCUMENTS

| | | | |
|---|---|---|---|
| 3,826,473 A | 7/1974 | Huber | |
| 4,340,997 A | 7/1982 | Voss | |
| 4,827,876 A * | 5/1989 | Krekelberg | 119/771 |
| 5,205,020 A | 4/1993 | Kamper | |
| 5,423,644 A | 6/1995 | First, Sr. | |
| 5,429,462 A | 7/1995 | Anderson | |
| 5,494,387 A | 2/1996 | Ruegg | |
| 5,531,297 A | 7/1996 | Pipan | |
| 5,542,798 A * | 8/1996 | Rawdon et al. | 410/100 |
| 5,551,379 A * | 9/1996 | Hart | 119/771 |
| 5,611,520 A | 3/1997 | Soderstrom | |
| 5,649,414 A | 7/1997 | Rawdon | |
| 5,718,190 A * | 2/1998 | Tinker | 119/771 |
| 5,904,341 A | 5/1999 | Norrby | |
| 5,950,569 A * | 9/1999 | Perrulli | 119/770 |
| 6,530,127 B2 | 3/2003 | Curtin, Sr. | |
| 6,698,723 B1 | 3/2004 | Antonini | |
| 6,705,811 B1 | 3/2004 | Selby | |
| 7,207,089 B2 * | 4/2007 | Hanson | 24/68 CD |
| 7,296,326 B2 | 11/2007 | Madachy et al. | |
| D569,050 S * | 5/2008 | Spater et al. | D30/152 |
| 7,861,382 B1 | 1/2011 | Madachy et al. | |
| 7,874,047 B2 | 1/2011 | Breeden | |
| D652,585 S * | 1/2012 | Lawley | D30/153 |
| D683,085 S * | 5/2013 | Parker | D30/152 |
| 2008/0118324 A1 | 5/2008 | Fritel | |
| 2009/0283729 A1 | 11/2009 | Carlson et al. | |

* cited by examiner

*Primary Examiner* — H Gutman
(74) *Attorney, Agent, or Firm* — Armstrong Teasdale LLP

(57) ABSTRACT

A cargo restraint system is provided. The system includes a fixed-hook assembly including a frame and a hook extending from the frame. The system also includes a fabric strap including a first end and a second end and a tensioner assembly configured to receive and maintain the second end of the fabric strap therein when in a locked configuration, wherein the tensioner assembly is configured to reduce in length when placed in the locked configuration. At least a portion of the fabric strap is received within the fixed-hook assembly.

22 Claims, 8 Drawing Sheets

CARGO RESTRAINT SYSTEM AND METHOD FOR RESTRAINING CARGO

CROSS REFERENCE TO RELATED APPLICATIONS

This application is a divisional of U.S. patent application Ser. No. 12/200,226, filed Aug. 28, 2008, which is incorporated herein by reference in its entirety.

BACKGROUND

The technical field relates generally to lightweight cargo restraint devices, and more particularly, systems for use in securing cargo during transportation.

Some air cargo restraint systems use metal chains with a large tensioning device attached to the chain at one end and a hook at the other end for attaching air cargo to another chain or structure. Such air cargo restraint systems may be very heavy, rely on chains, and require a large amount of adjustment on the tensioning device to impart the required preload to the chains. Further, only a limited number of air cargo restraint systems employing chains can be carried on each flight because of the weight and bulk of the chains. Moreover, a loadmaster may be able to carry only a small number of restraint systems or other cargo at a time, which in turn requires numerous trips to a restraint system storage area physically separate from the aircraft.

Furthermore, the total number of restraint systems continuously deployed on an aircraft may be an aircraft weight issue. The weight of each system multiplied by the number of systems deployed and thus carried on each aircraft impacts total aircraft cargo weight limitations and increases aircraft fuel consumption.

It would be advantageous to provide a cargo restraint system for use on military and/or civilian aircraft that uses a lighter-weight strap to restrain cargo instead of heavier chain currently used in some known cargo restraint systems. It would also be advantageous to provide a cargo restraint system that includes a tensioning assembly that is reduced in size and weight to enable a greater number of such units to be carried aboard each flight.

SUMMARY

In one aspect, a cargo restraint system is provided. The system includes a fixed-hook assembly including a frame and a hook extending from the frame. The system also includes a fabric strap including a first end and a second end and a tensioner assembly configured to receive and maintain the second end of the fabric strap therein when in a locked configuration, wherein the tensioner assembly is configured to reduce in length when placed in the locked configuration. The tensioner assembly includes a tensioner assembly body having a plurality of jaws having a plurality of teeth configured to engage the fabric strap, a fastener assembly including a threaded stud extending into the tensioner assembly body, and a handwheel configured to selectively adjust the fastener within the tensioner assembly.

In another aspect, a cargo restraint tensioning assembly is provided. The tensioning assembly a tensioner assembly body having a plurality of jaws having a plurality of teeth configured to engage the fabric strap, a fastener assembly including a threaded stud extending into the tensioner assembly body, and a handwheel configured to selectively adjust the fastener within the tensioner assembly.

In yet another embodiment, a method for restraining cargo on a transport vehicle is provided. The method includes positioning an article to be secured within said transport vehicle, attaching a fixed hook assembly to at least one of a structural position on the transport vehicle and a slider assembly positioned on a fabric strap, and coupling the fabric strap to the fixed hook assembly at a first position. The method also includes attaching a tensioning device to a second structural position on the vehicle, coupling the fabric strap to the tensioning device at a second position, adjusting the fabric strap such that fabric strap is substantially taut about the cargo, and securing the tensioning device such that a pre-load is exerted on the strap.

DETAILED DESCRIPTION

Figure 1:
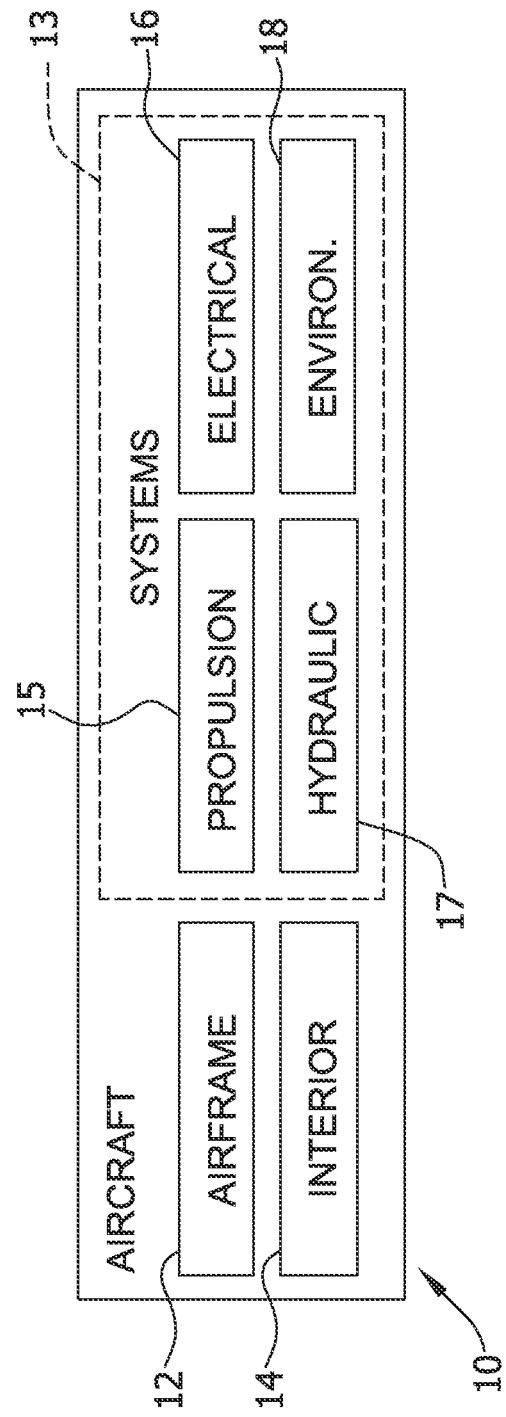
FIG. 1 is a block diagram of an exemplary aircraft.

Referring more particularly to the drawings, embodiments of the disclosure may be described in the context of an aircraft 10 as shown in FIG. 1. As shown in FIG. 1, the aircraft 10 include an airframe 12 with a plurality of systems 13 and an interior 14. Examples of high-level systems 13 include one or more of a propulsion system 15, an electrical system 16, a hydraulic system 17, and an environmental system 18. Any number of other systems may be included. Although an aerospace example is shown, the principles of this disclosure may be applied to other industries, such as the automotive industry.

Figure 2:
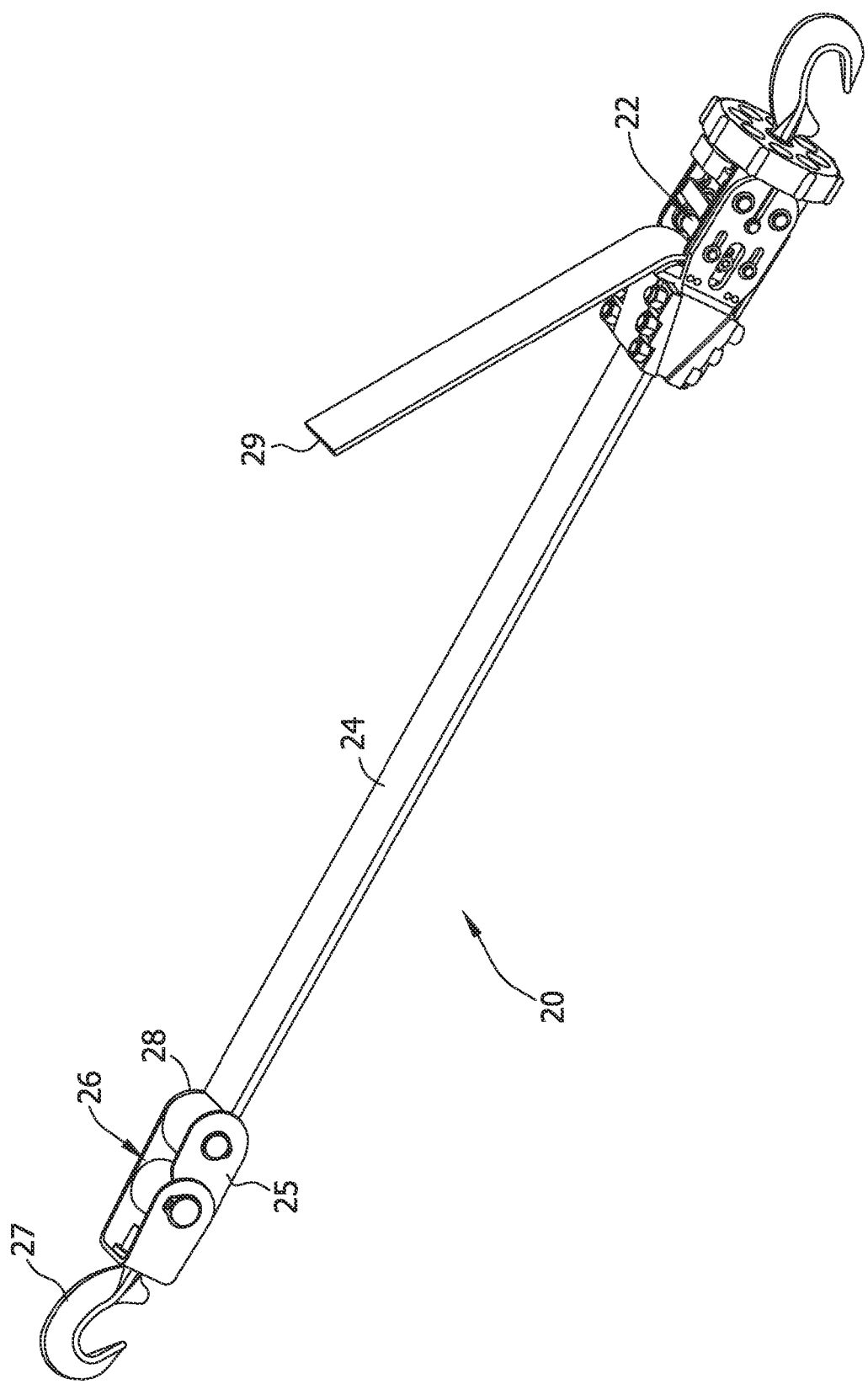
FIG. 2 is a perspective view of an exemplary air cargo restraint system for use in securing cargo within a transport vehicle.

FIG. 2 is a perspective view of an exemplary air cargo restraint system 20 for use in securing cargo within a transport vehicle (not shown). In one exemplary embodiment, system 20 includes a tensioner assembly 22, a fabric strap 24, and a fixed hook assembly 26. Fabric strap 24 is coupled to fixed hook assembly 26 at a first end 28. Fabric strap 24 is received by tensioner assembly 22, as described in more detail herein. A second end 29 of fabric strap 24 is then used to position fabric strap 24 within tensioner assembly 22, and to facilitate applying the required pre-load to the secured cargo (not shown). Fabric strap 24 is fabricated from a fabric material with desirable stretch properties. In one exemplary embodiment, fabric strap 24 is fabricated from a Kevlar® weave. Alternatively, fabric strap 24 may be fabricated from any high tensile fiber material that enables air cargo restraint system 20 to function as described herein. Tensioner assembly 22 facilitates securing fabric strap 24 in place, as will be described in greater detail below. Fixed hook assembly 26 includes a frame 25 and a hook 27 extending from frame 25, wherein hook 27 is configured to provide a first tie-down point (not shown).

Figure 3:
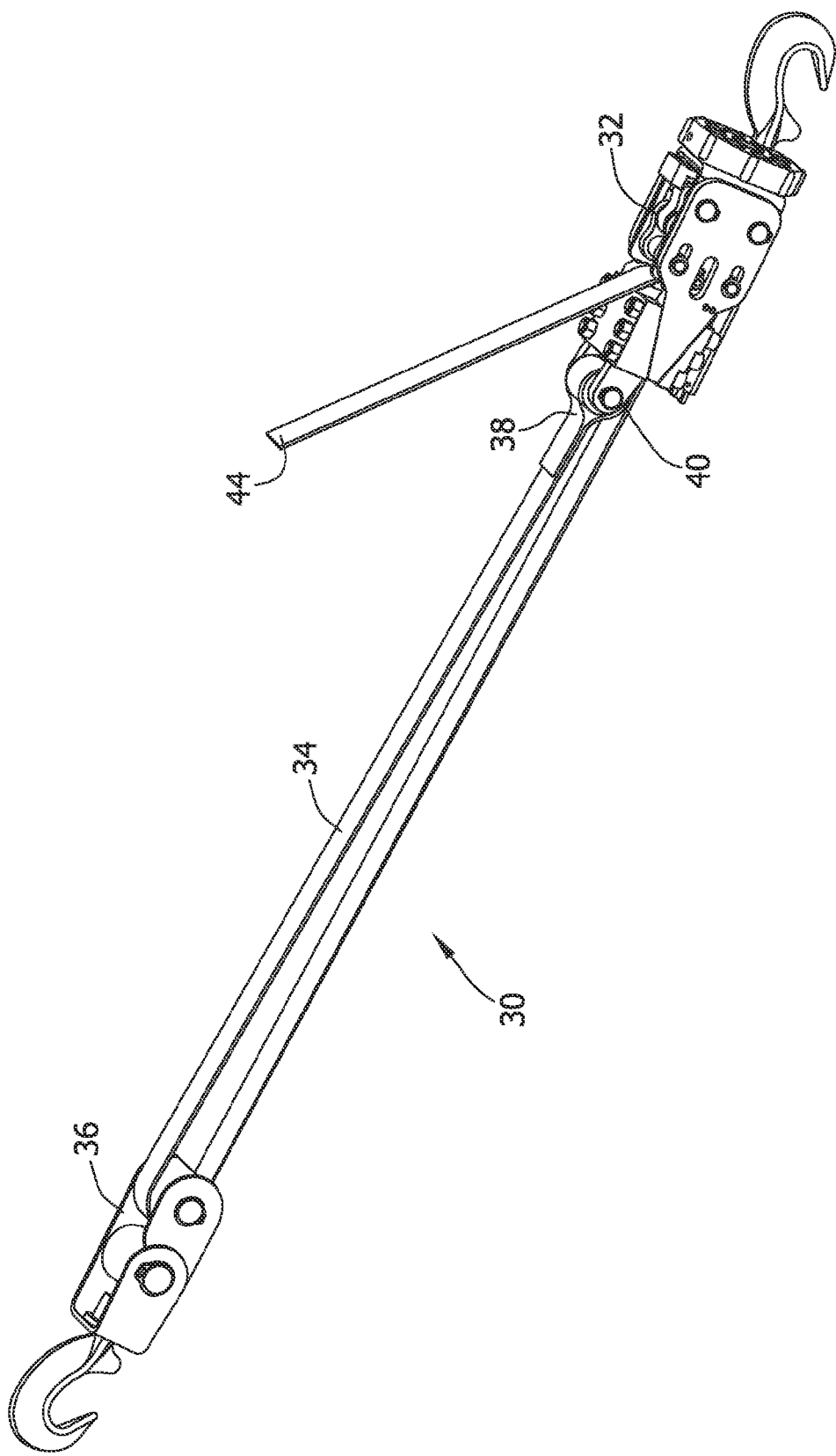
FIG. 3 is a perspective view of an alternative air cargo restraint system for heavier loads.

FIG. 3 is a perspective view of an alternative air cargo restraint system 30 for restraining heavier loads. System 30 includes a tensioner assembly 32, a fabric strap 34, and a fixed hook assembly 36. In the illustrated embodiment, a first end 38 of strap 34 is coupled to tensioner assembly 32. More specifically, first end 38 is coupled to a mounting arm 40 positioned upon tensioner assembly 32. System 30 includes a double strap configuration, whereby a second end 44 of strap 34 is threaded through fixed hook assembly 36 and is received by tensioner assembly 32, as illustrated and as described in more detail herein. Second end 44 is then inserted within tensioner assembly 32, and facilitates applying the required pre-load to the secured cargo (not shown). The described double-strap configuration divides the force placed on system 30 by a restrained object, thus allowing substantially the same tensioner assembly and fixed hook as system 10 for use in securing a heavier load. However, tensioner assembly 32 may include components with increased size and strength to account for the heavier load.

Figure 4:
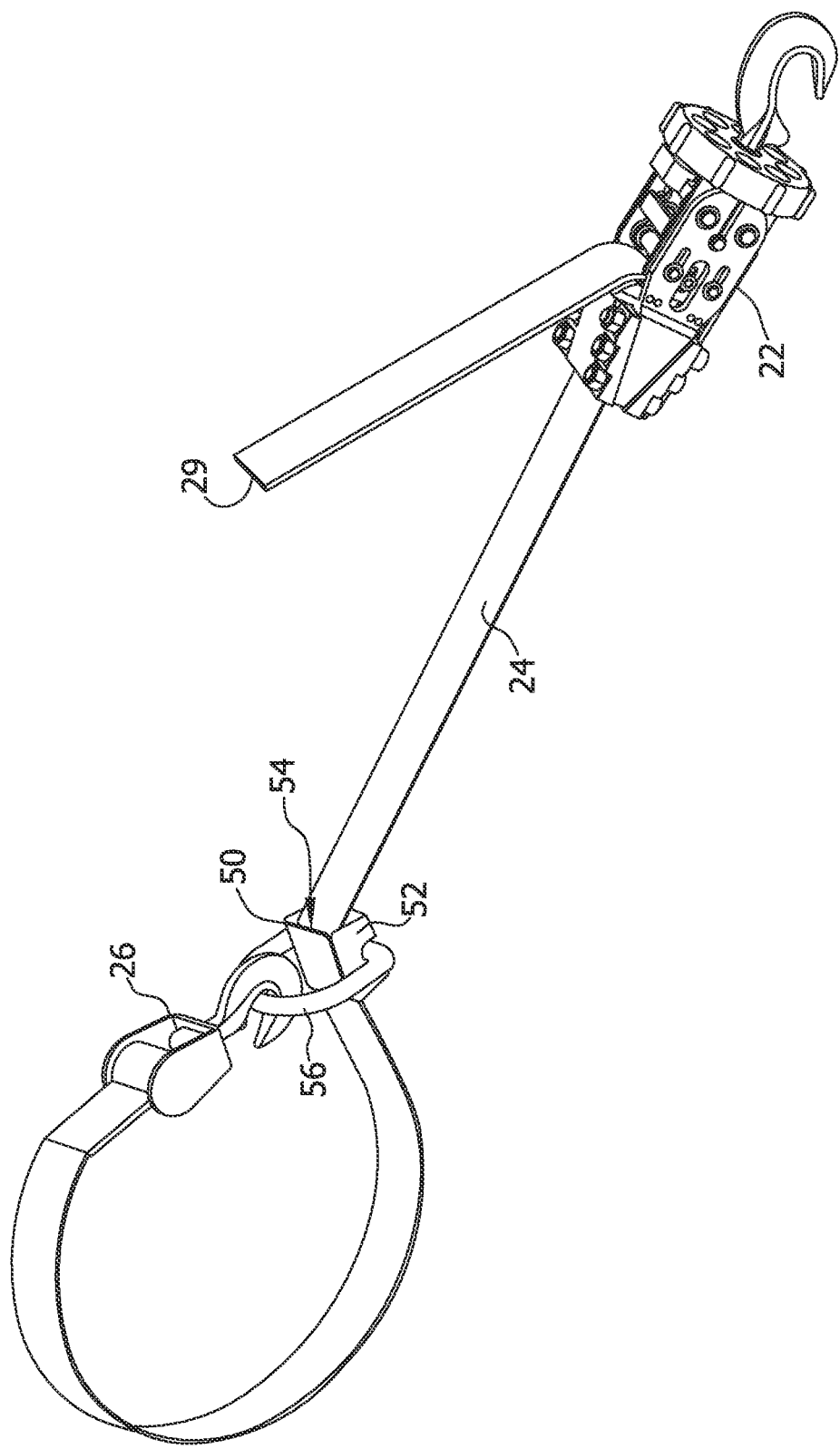
FIG. 4 is a perspective view an exemplary slider assembly used with the air cargo restraint system shown in FIG. 1.

FIG. 4 is a perspective view of an exemplary slider assembly 50 incorporated into the air cargo restraint system 20 shown in FIG. 2. In one exemplary embodiment, slider assembly 50 includes a base 52 including a channel 54 that receives fabric strap 24 therethrough. Slider assembly 50 includes a ring 56 rotatably coupled to base 52. In one exemplary embodiment, ring 56 is a D-shaped ring. Alternatively, ring 56 may be of any size and orientation to allow system 10 to function as described herein. In one exemplary embodiment, ring 56 is engaged by fixed hook assembly 26, as shown in FIG. 2. Alternatively, ring may be engaged by tensioner assembly 22, or any external hook (not shown) that will enable system 10 to function as described herein. Including slider assembly 50 in an air cargo restraint system (such as system 20) allows for a variety of restraint system configurations not limited to that shown in FIG. 4.

Figure 5:
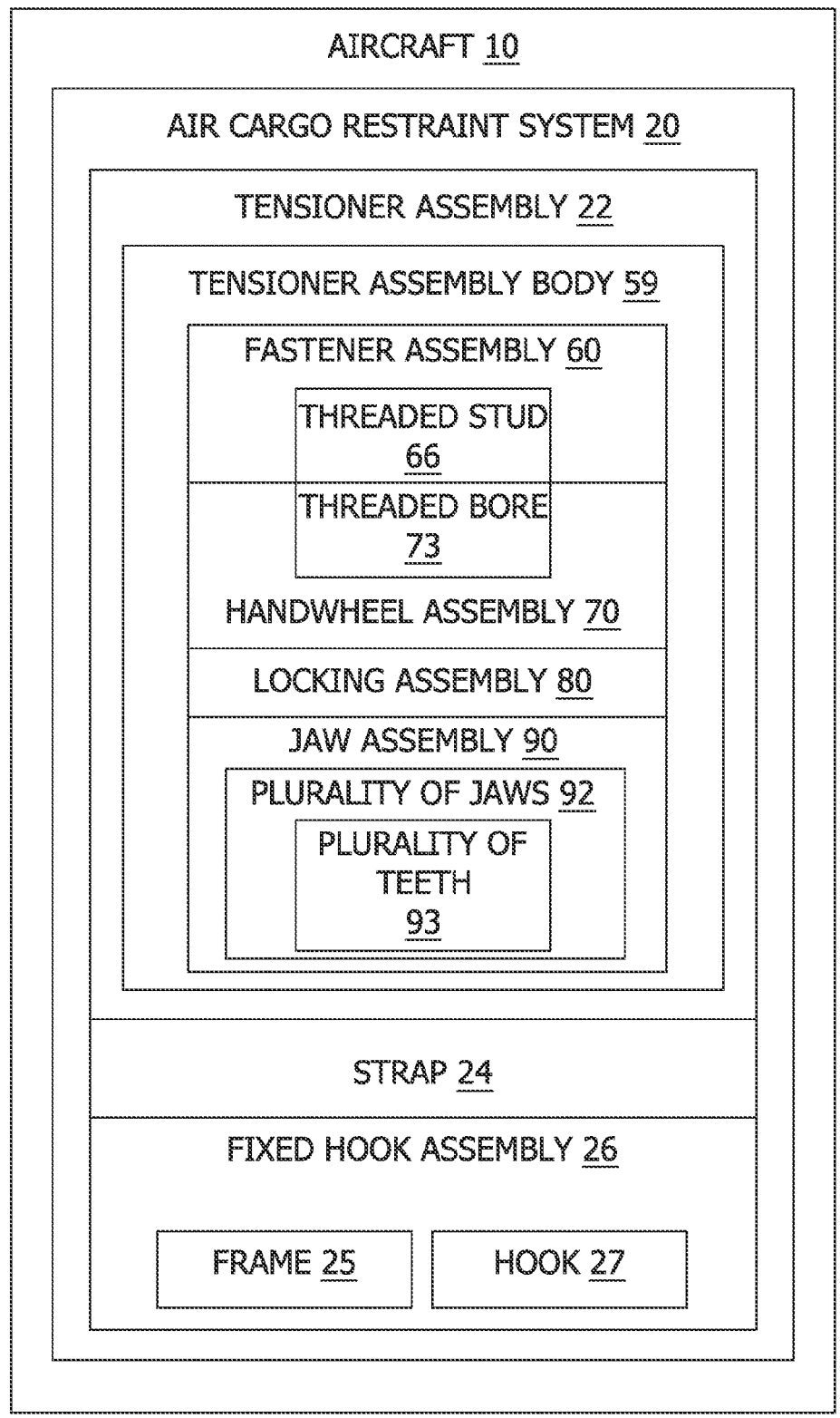
FIG. 5 is a functional block diagram of the aircraft shown in FIG. 1 including air cargo restraint system.
Figure 6:
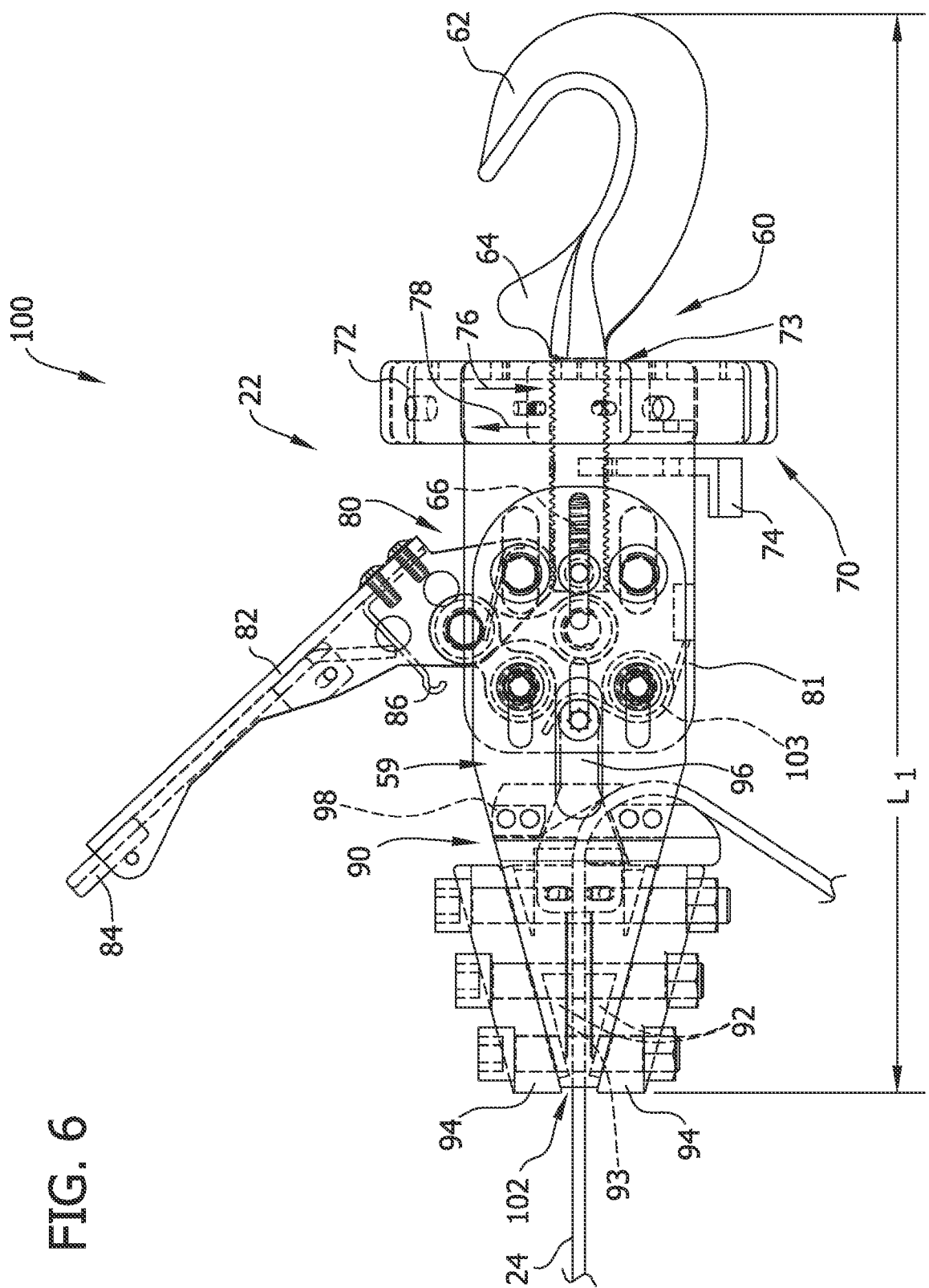
FIG. 6 is a schematic illustration of an exemplary tensioner assembly in an unlocked configuration.
Figure 7:
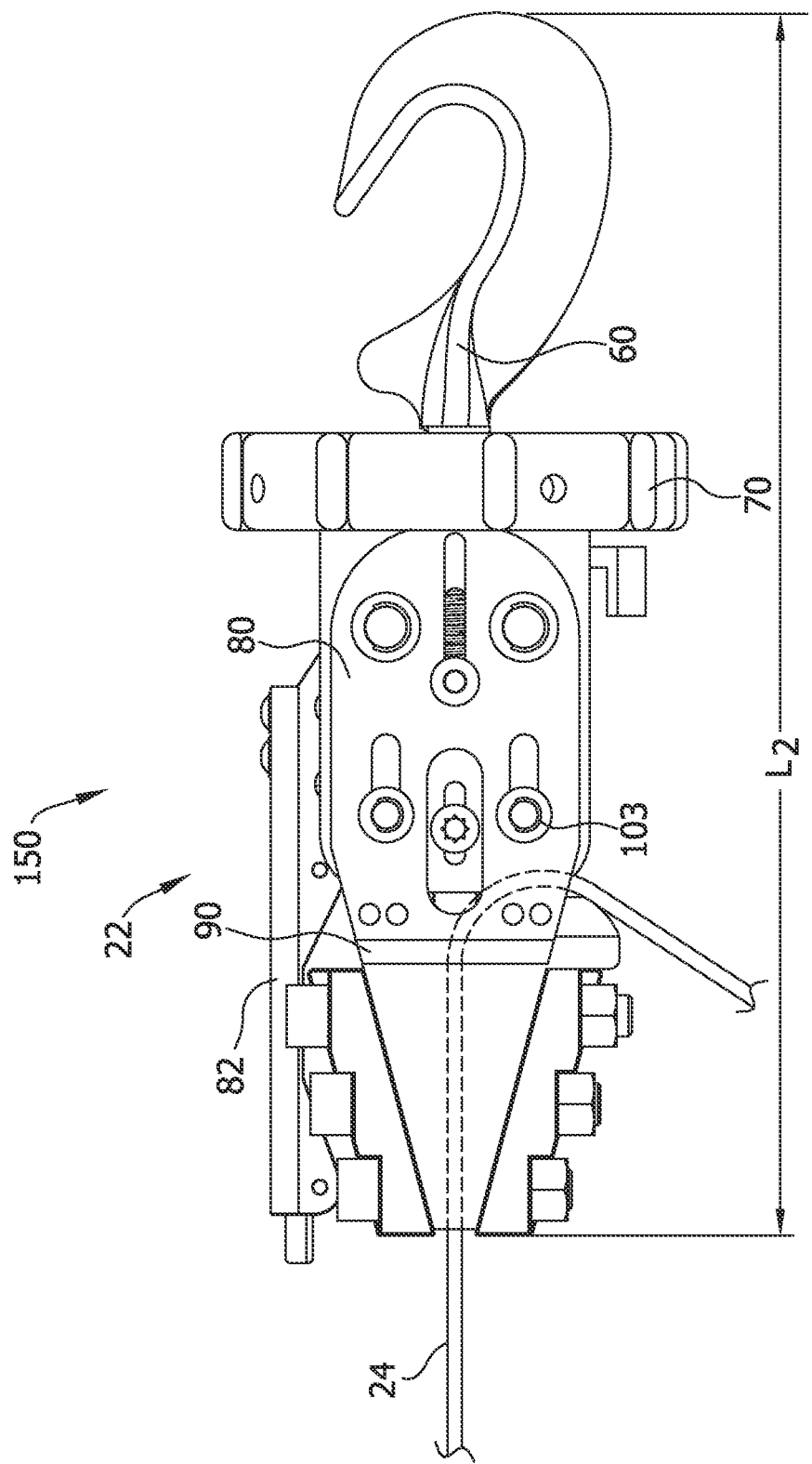
FIG. 7 is a side view of an exemplary tensioner assembly in a locked configuration.

FIG. 5 is a functional block diagram of aircraft 10 including air cargo restraint system 20. FIG. 6 is a schematic illustration of an exemplary tensioner assembly 22 in an unlocked configuration 100, and FIG. 7 is a side view of tensioner assembly 22 in a locked configuration 150. Tensioner assembly 22 may be used in the light load system 20 of FIG. 2. In an alternative embodiment, tensioner assembly 22 includes mounting arm 40 (shown in FIG. 3), allowing it to be used in the heavy load system 30 of FIG. 3.

Referring specifically to FIG. 5, aircraft 10 includes air cargo restraint system 20 therein. Air cargo restraint system 20 includes tensioner assembly 22 coupled via fabric strap 24 to fixed hook assembly 26, as described in more detail herein. Fixed hook assembly 26 includes a frame 25 and a hook 27, and is configured as described herein. Tensioner assembly 22 includes a tensioner assembly body 59 within which is a fastener assembly 60, handwheel assembly 70, locking assembly 80, and jaw assembly 90. Fastener assembly 60 includes a threaded stud 66 that is threadably coupled to handwheel assembly 70 within a threaded bore 73, as described in more detail herein. Jaw assembly 90 includes a plurality of jaws 92 that each includes a plurality of teeth 93 for use in gripping fabric strap 24, as described in more detail herein.

Referring to FIGS. 6 and 7, fastener assembly 60 includes a hook 62, a lip 64, and a threaded stud 66. In the exemplary embodiment, hook 62 is fixedly coupled to tensioner assembly 22. Alternatively, hook 62 is rotatably coupled to tensioner assembly such that hook rotates when coupled to a tie-down point or load, as described in more detail herein. Lip 64 is an opposing member that is pivotably attached to and engages hook 62 such that when the hook 62 is engaged with another apparatus, such as another hook on the object being restrained, the lip 64 prevents fastener assembly 60 from disengaging the other apparatus. Fixed hook assembly 16 and 36 on respective restraint system 10 and 30 (as shown respectively in FIGS. 1 and 2) can also include a lip (not shown) to prevent unintended disengagement. Threaded stud 66 threadably engages handwheel assembly 70, as described herein, and serves to increase the tension load, as described in more detail herein.

Handwheel assembly 70 includes a handwheel 72 and handwheel safety 74. In one exemplary embodiment, handwheel 72 includes a threaded bore 73 therethrough that is configured to receive the threaded stud 66 therein. Handwheel 72 is configured such that when rotated in a first direction 76, the threaded stud 66 of fastener assembly 60 extends into tensioner assembly 22 and hook 62 moves toward tensioner assembly 22, increasing the tension load. When handwheel 72 is rotated in a second direction 78, hook 62 moves away from tensioner assembly 22, decreasing the tension load. Handwheel safety 74 is configured such that when handwheel safety 74 is in a locked position, handwheel 72 can be rotated in a first direction 76, but cannot be rotated in a second direction 78. Handwheel safety 74 is further configured such that when handwheel safety 74 is in a released position, handwheel 72 is free to rotate in both first direction 76 and second direction 78.

In the exemplary embodiment, as shown in FIG. 6, locking assembly 80 includes a body 81, an actuating lever 82 pivotably attached to body 81, a safety release 84, and a safety hook 86. Lever 82 may either be in a released position, as shown in FIG. 5, or in a locked position, as shown in FIG. 6. When lever 82 is in a locked position, locking assembly 80 works in conjunction with jaw assembly 90 to secure fabric strap 24, as is described in more detail below. Safety hook 86 is configured such that when lever 82 is in a locked position, safety hook 86 engages part of tensioner assembly 22 so that lever 82 may not be moved from a locked position, thus providing added redundancy to locking assembly 80. Safety release 84 is configured such that by moving safety release 84, safety hook 86 disengages the tensioner assembly 22 so that lever 82 may be moved from the locked configuration 150 to the unlocked configuration 10. Safety hook 86 and safety release 84 prevent lever 82 from being locked and/or unlocked accidentally or unintentionally.

Referring to FIGS. 6 and 7, the locking assembly 80 is further configured such that tensioner assembly 22 is shortened in length by a small percentage of the total length when the lever 82 is placed in a locked configuration 150, as described in more detail herein. More specifically, in the unlocked configuration 100, tensioner assembly 22 has a length $L_1$ (shown in FIG. 6). When lever 82 is placed in the locked configuration 150, tensioner assembly has a length $L_2$, such that $L_2$ is less than $L_1$. This change in length translates into a tension load when coupled to the fabric strap 24, thus eliminating the need for substantial additional load to be placed onto the fabric strap 24 via fastener assembly 60. This increased tension load from the dimension change requires less turns of handwheel 72 to achieve a desired tension load.

In one exemplary embodiment, jaw assembly 90 includes a plurality of jaws 92, a plurality of teeth 93, a jaw guide 94, a plate 96, a strap stop extension 98, and a strap opening 102. Fabric strap 24 threads through the strap opening 102 and between the jaws 92. Strap stop extension 98 is configured to guide fabric strap 24 out of the tensioner assembly 22 after it passes through the jaws 92. Jaws 92 each have a smooth angled surface that slides along the angled surface of the corresponding jaw guide 94. The jaws 92 also have a substantially flat, toothed surface. When the jaws are forced towards the strap opening 102, the angled surface of the jaw guides 94 force the toothed surfaces of the jaws 92 together.

Jaw plate 96 is configured such that while lever 82 of locking assembly 80 moves from a released to a locked position, jaw plate 96 moves towards strap opening 102. Connecting locking assembly 80 to jaw plate 96 may be done with a spring 103, as is shown in FIGS. 6 and 7, or by other mechanical means to facilitate biasing locking assembly 80 towards the locked configuration 150. Jaw plate 96 is further configured to be attached to jaws 92, such that when lever 82 is moved to a locked position, jaws 92 clamp down against strap 24 and secure fabric strap 24 therein. Jaw plate 96 is attached to jaws 92, such that the jaws 92 move towards each other at the same rate when clamping. The jaws 92 are further configured such that they may grab fabric strap 24 at any point along its length.

Tensioner assembly 22 is further configured such that when fabric strap 24 is secured by the jaws 92, if the tension load increases, the jaws 92 grab the fabric strap 24 with an increased gripping force. This prevents fabric strap 24 from becoming disengaged from tensioner assembly 22.

Figure 8:
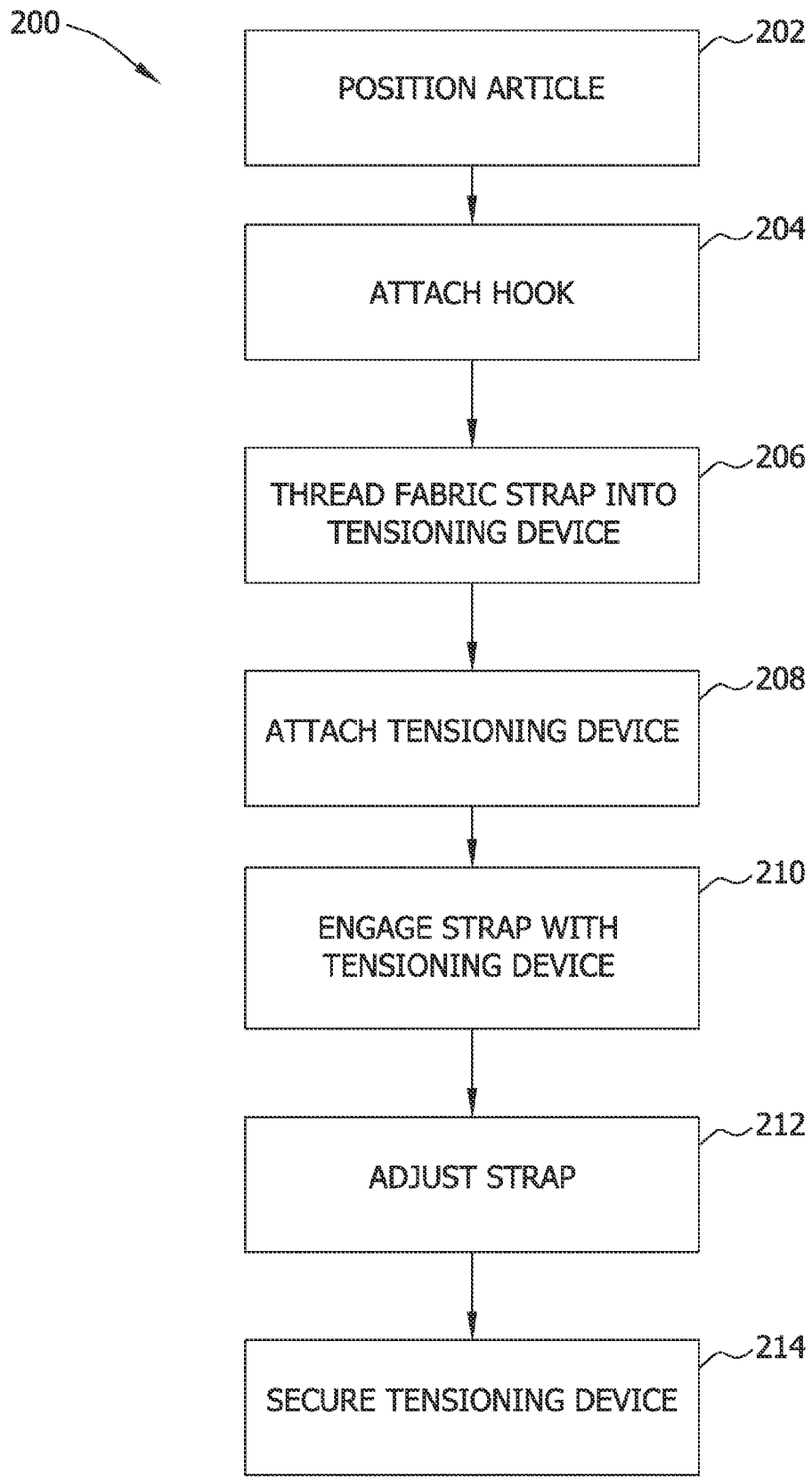
FIG. 8 is a flowchart for a method of securing air cargo using restraint system shown in FIG. 1.

FIG. 8 is a flowchart for a method 200 of restraining cargo using an exemplary cargo restraint system. In one exemplary embodiment, method 200 includes positioning 202 an article to be transported. Method 200 includes attaching 204 a fixed hook assembly to a first structural position. In one exemplary embodiment, fixed hook assembly is affixed to the cargo. Alternatively, fixed hook assembly is coupled to one of a tie-down point, a slider assembly (as described herein), or any location that enables the exemplary cargo restraint system to function as described herein. In a further embodiment, fixed hook assembly may be couple indirectly to either the tie-down point, the slider assembly or any other suitable location via a secondary chain, rope, cable, shackle or any other suitable intermediate coupling device that will enable the cargo restraint system to function as described herein.

Method 200 includes threading 206 a second end of the fabric strap into a tensioning device. Method 200 includes attaching 208 a tensioning device to a second structural position. Method 200 further includes engaging 210 the fabric strap element with the tensioning device at a second end, adjusting 212 the fabric strap such that the fabric strap is substantially taught around the cargo, and 214 securing the tensioning device such that a pre-load is exerted on the fabric strap.

Exemplary embodiments for light-weight cargo restraint systems for use on aircraft and in other vehicles are described in detail above. The above-described systems include light weight woven straps which have acceptable elongation characteristics under load. These straps are used in lieu of the current system that utilizes heavy tie-down chains attached in some manner about the load. The tensioner assemblies described herein securely grab the woven straps at any location along the strap's length and then by a simple manipulation quickly tension the straps to the required pre-load. The system will be easy and quickly engaged and disengaged. A hook at the other end can be quickly attached to the load or can be looped back to the straps using a device that slides on the woven strap. The systems described herein are significantly lighter, smaller, easier to handle, much easier and quicker to tightened to the required tolerance. In addition, because of its weight and design the embodiments disclosed herein allow a loadmaster to carry from storage to the load more tensioning systems at one time than current heavier chain-based systems allow. Up to a 60% reduction of weight can be expected with the light weight restraint system due to elimination of the bulky, heavier chains. For example, on large aircraft, a 60% weight reduction may equal approximately one ton of weight savings per aircraft.

Although the foregoing description contains many specifics, these should not be construed as limiting the scope of the present disclosure, but merely as providing illustrations of some of the presently preferred embodiments. Similarly, other embodiments of the disclosure may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications to the disclosure which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to describe the disclosed embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cargo restraint system comprising:
    a fixed-hook assembly comprising a frame and a first hook extending from said frame;
    a fabric strap including a first end and a second end, at least a portion of said fabric strap received by said fixed-hook assembly; and
    a tensioner assembly comprising:
        a tensioner assembly body configured to receive and maintain said second end of said fabric strap therein when in a locked configuration, said tensioner assembly body configured to reduce in length when placed in the locked configuration;
        a second hook; and
        a handwheel rotatably coupled to said tensioner assembly body, said handwheel operable to selectively adjust a position of said tensioner assembly body relative to said second hook.

2. A cargo restraint system in accordance with claim 1 wherein said tensioner assembly further comprises:
    a jaw assembly including a plurality of jaws including a plurality of teeth configured to engage said fabric strap.

3. A cargo restraint system in accordance with claim 2 wherein said tensioner assembly further comprises a locking assembly comprising an actuating lever configured to engage and disengage said locking assembly such that said fabric strap is engaged by said plurality of jaws when said locking assembly is engaged, said locking assembly operable to increase a gripping force on said fabric strap as a tension load on said fabric strap increases.

4. A cargo restraint system in accordance with claim 3 wherein said locking assembly further comprises a safety release configured to maintain said locking assembly in an engaged configuration.

5. A cargo restraint system in accordance with claim 2 wherein said plurality of jaws comprise a pair of parallel jaws.

6. A cargo restraint system in accordance with claim 5 wherein said parallel jaws are movable towards one another as a tension load on said fabric strap is increased to increase a gripping force.

7. A cargo restraint system in accordance with claim 6, wherein said parallel jaws each have a substantially smooth angled surface configured to slide along an angled surface of a jaw guide to cause said parallel jaws to move towards one another as the tension load increases.

8. A cargo restraint system in accordance with claim 6 wherein said parallel jaws are non-rotatably movable towards one another.

9. A cargo restraint system in accordance with claim 1, wherein said tensioner assembly further comprises a handwheel safety configured to prevent the rotation of said handwheel when said handwheel safety is in a locked configuration.

10. A cargo restraint system in accordance with claim 1 further comprising a slider assembly comprising a ring, said slider assembly positioned along said fabric strap and configured to engage said first hook of said fixed-hook assembly.

11. A cargo restraint system in accordance with claim 1 wherein said tensioner assembly further comprises a mounting arm configured to fixedly couple to said first end of said fabric strap.

12. A cargo restraint system in accordance with claim 1 further comprising a strap stop extension coupled to said tensioner assembly, said strap stop extension configured to engage said fabric strap when said tensioner assembly body is in the locked configuration.

13. A cargo restraint tensioner assembly configured to receive a fabric strap therethrough, said tensioner assembly comprising:
 a tensioner assembly body comprising at least one jaw comprising a plurality of teeth configured to engage the fabric strap, said tensioner assembly body configured to reduce in length when placed in a locked configuration;
 a hook comprising a threaded stud that extends into said tensioner assembly body; and
 a handwheel rotatably coupled to said tensioner assembly body and comprising a threaded bore therethrough, said threaded bore configured to engage said threaded stud, said handwheel operable to selectively adjust a position of said tensioner assembly body relative to said hook.

14. A cargo restraint tensioner assembly in accordance with claim 13 further comprising a mounting arm configured to fixedly couple to the fabric strap.

15. A cargo restraint tensioner assembly in accordance with claim 13 further comprising a handwheel safety configured to prevent the rotation of said handwheel when said handwheel safety is in a locked configuration.

16. A cargo restraint tensioner assembly in accordance with claim 13 wherein said tensioner assembly further comprises a locking assembly comprising an actuating lever configured to engage and disengage said locking assembly such that the fabric strap is engaged by said at least one jaw when said locking assembly is engaged.

17. A cargo restraint tensioner assembly in accordance with claim 16 wherein said locking assembly further comprises a safety release configured to maintain said locking assembly in an engaged configuration.

18. A cargo restraint tensioner assembly in accordance with claim 13 further comprising a strap stop extension coupled to said tensioner assembly body, said strap stop extension configured to engage the fabric strap when said tensioner assembly body is in the locked configuration.

19. A cargo restraint tensioner assembly in accordance with claim 13 wherein said at least one jaw comprises a pair of parallel jaws.

20. A cargo restraint tensioner assembly in accordance with claim 19 wherein said parallel jaws are movable towards one another as a tension load on the fabric strap is increased to increase a gripping force.

21. A cargo restraint tensioner assembly in accordance with claim 20 wherein said parallel jaws each have a substantially smooth angled surface configured to slide along an angled surface of a jaw guide to cause said parallel jaws to move towards one another as the tension load increases.

22. A cargo restraint tensioner assembly in accordance with claim 18 wherein said strap stop extension is configured to guide the fabric strap out of said cargo restraint tensioner assembly.

* * * * *